United States Patent
Van Horck

(10) Patent No.: US 7,503,058 B2
(45) Date of Patent: Mar. 10, 2009

(54) STANDARDIZED THEME HANDLING FOR DIGITAL TELEVISION

(75) Inventor: Hendrikus G. Van Horck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 378 days.

(21) Appl. No.: 10/567,394

(22) PCT Filed: Aug. 4, 2004

(86) PCT No.: PCT/IB2004/051391

§ 371 (c)(1),
(2), (4) Date: Feb. 7, 2006

(87) PCT Pub. No.: WO2005/015913

PCT Pub. Date: Feb. 17, 2005

(65) Prior Publication Data

US 2006/0230417 A1    Oct. 12, 2006

Related U.S. Application Data

(60) Provisional application No. 60/529,492, filed on Dec. 15, 2003, provisional application No. 60/493,264, filed on Aug. 7, 2003.

(51) Int. Cl.
*G06F 3/00* (2006.01)
*G06F 13/00* (2006.01)
*H04N 5/445* (2006.01)

(52) U.S. Cl. .................................. 725/45; 725/46

(58) Field of Classification Search .............. 725/45–46
See application file for complete search history.

(56) References Cited

U.S. PATENT DOCUMENTS

| | | | | |
|---|---|---|---|---|
| 5,828,402 A * | 10/1998 | Collings | ....................... | 725/28 |
| 5,832,001 A * | 11/1998 | Choi | ........................... | 714/790 |
| 6,580,679 B1 * | 6/2003 | Maeda | ..................... | 369/275.3 |
| 6,799,328 B1 * | 9/2004 | Freimann et al. | .............. | 725/44 |
| 6,925,509 B2 * | 8/2005 | Ihara et al. | ..................... | 710/62 |
| 7,254,234 B2 * | 8/2007 | Sugahara et al. | .............. | 380/37 |
| 2001/0016948 A1 | 8/2001 | Longhorn et al. | | |
| 2002/0124248 A1 * | 9/2002 | Matey | ........................ | 725/22 |

FOREIGN PATENT DOCUMENTS

| | | |
|---|---|---|
| EP | 0940043 B1 | 9/1999 |
| WO | WO0027114 | 5/2000 |
| WO | WO0141439 A1 | 6/2001 |

\* cited by examiner

*Primary Examiner*—John W Miller
*Assistant Examiner*—Robert Hance

(57) ABSTRACT

Genre or theme assignment data (104) for a program in a digital television or other data transmission is recovered by a receiver (100) and mapped to a genre in a standardized genre assignment schedule (240). A country associated with the transmission is identified, such as by obtaining a country code (105) from the digital data transmission, or via a receiver setting. A genre assignment schedule is identified based on the country. Data, such as user nibbles (220) or standard content nibbles (230), is obtained from the transmission to identify the original genre and assign the program to a corresponding standardized genre.

20 Claims, 1 Drawing Sheet

STANDARDIZED THEME HANDLING FOR DIGITAL TELEVISION

CROSS REFERENCE TO RELATED APPLICATION

Figure 1:
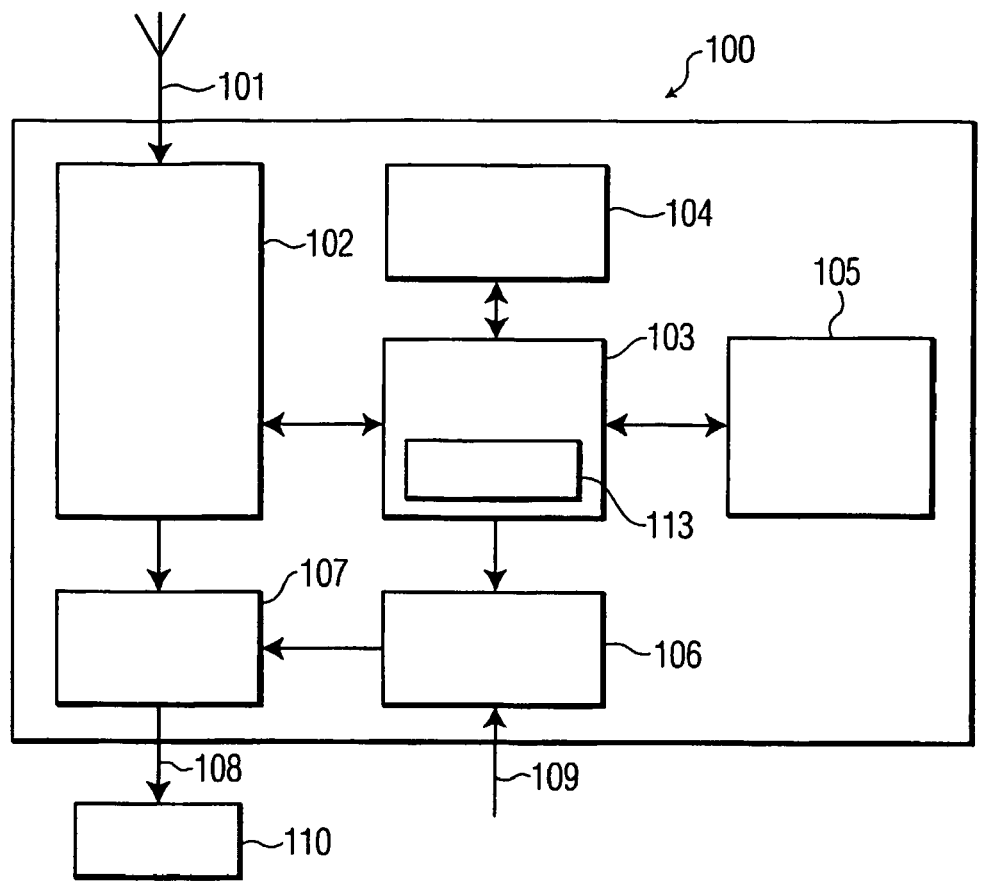

This application claims the benefit of U.S. provisional application Ser. Nos. 60/493,264 and 60/529,492 filed Aug. 7, 2003 and Dec. 15, 2003, which is incorporated herein in whole by reference.

The invention relates generally to digital television communications and, more particularly, to a technique for providing standardized themes, e.g., genres, for programs.

Digital television communications have become increasingly popular due to the quality of the audio and video signals and the various features that can be realized. For example, standards defined by the Digital Video Broadcasting (DVB) consortium have been implemented in many parts of the world. Among other things, these standards include a series of transmission specifications, including DVB-S, a satellite transmission standard, DVB-C, a cable delivery standard, and DVB-T, a terrestrial transmission standard. DVB-T is a sophisticated and flexible digital terrestrial transmission system that is based on COFDM (Coded Orthogonal Frequency Divisional Multiplexing) and QPSK, 16 QAM and 64 QAM modulation. DVB-T allows services providers to match, and even improve on, analogue coverage, at a fraction of the power. Moreover, it extends the scope of digital terrestrial television in the mobile field, such as to portable hand-held devices.

Digital television transmissions include theme assignments, also known as genre assignments, for the different programs carried in the transmissions. The genres describe a category in which a program is placed, e.g., to assist the user in selecting a program or blocking a program. For example, genres include movies, news, sports, children's programs, and the like. However, a problem arises in that a receiver must be configured for the specific genre assignment scheme of the transmissions it receives. Costs are increased since receivers with different configurations must be maintained and deployed, e.g., in different countries. For example, for DVB-T receivers in Europe, there is the problem that D-book and E-book genres do not agree. Moreover, Spain has introduced its own set of genres based on the E-book with extensions.

Accordingly, it would be desirable to provide a method and apparatus for addressing the above and other issues.

In a particular aspect of the invention, a method provides standardized genre assignments. The method includes receiving at least a first digital data transmission, wherein at least one program in the first digital data transmission is associated with a genre according to a first genre assignment schedule, identifying a jurisdiction associated with the first genre assignment schedule, obtaining data from the first digital data transmission that identifies the associated genre, and mapping the at least one program to a genre in a standardized genre assignment schedule according to the associated identified jurisdiction and the associated identified genre.

A related receiver and program storage device are also provided.

Figure 2:
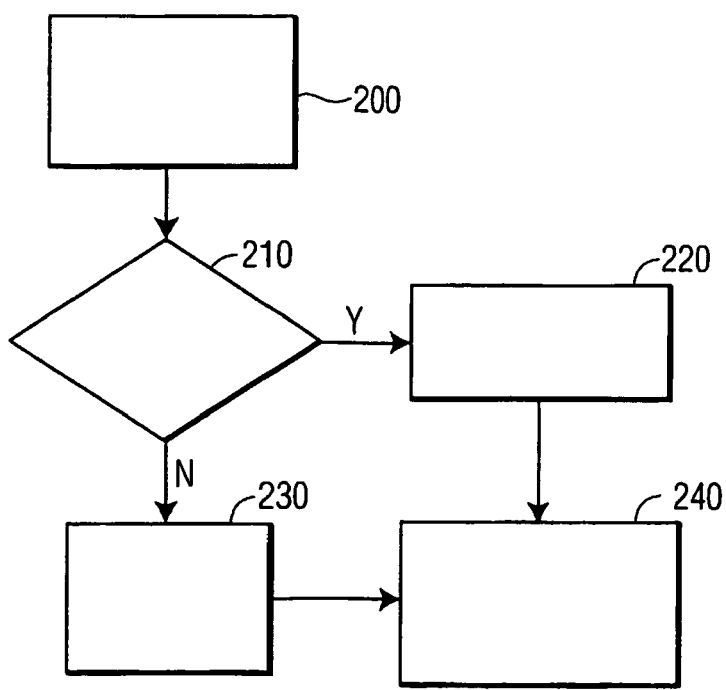

In the drawings:

FIG. 1 illustrates an example receiver for providing genre assignments, according to the invention; and FIG. 2 illustrates a method for providing genre assignments, according to the invention.

In all the Figures, corresponding parts are referenced by the same reference numerals.

FIG. 1 illustrates an example receiver for providing genre assignments according to the invention. Block 102 is a "tuner and decoder." Block 103 is "control circuitry." Block 113 is a "memory". Block 104 is a "genre data" memory. Block 105 is a "country/region setting" memory. Block 107 is "output circuitry". Block 106 is a "user interface." Block 110 is a "display".

The receiver 100 receives one or more digital television transmissions from one or more respective transmitters. For example, a transmission may be received that is associated with the same country in which the receiver 100 is located. The user may provide a country and/or region setting for the receiver, which does not necessarily have to correspond with the actual location of the receiver. The receiver 100 may be essentially any suitable data receiver, including Digital Home Equipment, e.g., a digital TV, an interactive digital TV (iDTV) set-top box (STB), personal video recorder (PVR), Digital Audio, or DVD. The receiver may further include a mobile receiver such as a PDA or mobile phone.

In accordance with the invention, the genre assignment data from the received transmission is mapped to a standardized genre assignment. In the DVB system, the genre assignment data for each program is denoted by the term content_descriptor, as discussed in further detail below. However, the invention is suitable for use with other digital data transmission schemes. The transmissions from different countries or other jurisdictions can have different content descriptor data The jurisdiction can be a country, group of countries, portion of a country, a region such as Europe, a city, and so forth. Advantageously, the receiver 100 can be provided in any location, where it reads the original genre assignment data of the received transmission that is provided by the broadcaster, and maps it to a standardized genre assignment schedule. The invention obviates the need for country-specific receivers.

In one possible approach, the invention is implemented using components within a television set-top box receiver, e.g., receiver 100 that receives a television signal via an input path 101, such as an antenna, and outputs a signal for display on a display device 110 such as a television via signal output path 108. However, the invention is generally applicable to any type of device that receives video and/or audio programs. For example, the invention may be implemented in a computer that receives video programs from a network such as the Internet, e.g., by downloading, streaming or broadcasting, such as webcasting. The video programs typically include an audio track although this is not required. Moreover, the invention can be used with audio-only programs such as those provided via the Internet, e.g., as webcasts, or via radio broadcasts, including terrestrial and satellite radio broadcasts.

The receiver 100 tunes, demultiplexes and decodes the received programs at a tuner/decoder 102. The genre assignment data carried in the received transmission is also tuned, decoded and recovered by the tuner/demultiplexer/decoder 102 and provided to control circuitry 103. The programs may be provided in a digital or analog multiplex that is transmitted by cable, satellite, or terrestrial broadcast, for example. Generally, one of the programs is decoded based on a channel selection made by the user/viewer via a handheld remote control. A user input signal from the remote control is processed by a user interface function 106 in the receiver 100. The remote control may use any type of communication path 109, such as infrared, wired, ultrasound, radio frequency, etc. When the user selects a channel via the user interface 106, the control circuitry 103 recovers the corresponding program, e.g., using information such as packet identifiers (PIDs), from the received transmission.

The decoded program may be communicated to the display device 10 via output circuitry 107 or stored locally for subsequent display. Control circuitry 103, such as a microprocessor with a working memory 113, may interact with the tuner/decoder 102 to control the functions of the tuner/decoder 102. The working memory 113 may be considered a program storage device that stores software that is executed by the control circuitry 103 to achieve the functionality described herein. However, resources for storing and processing instructions such as software to achieve the desired functionality may be provided using any known techniques.

The control circuitry 103 stores the genre assignment data in a genre data memory 104. A country and/or region setting may be stored in a memory 105 for use by the control circuitry 103 in its decision-making processes. The memories 103 and 105 are shown as being separate but may be combined with other memory resources. The country and region setting may be provided by the user via the user interface 106, or set by a hardware configuration, e.g., switch, at the receiver, such as at the time of manufacture or installation.

In some cases, the genres of the standardized genre assignment schedule are the same as the original genre assignments. For example, the original genre of "sports" in a received transmission may be mapped to the standardized genre of "sports". In other cases, multiple genres can be mapped to a singe genre. For example, genres of "baseball" and "football" can both be mapped to the genre of "sports". The standardized genre assignments may be used to assist the user in locating a program. For example, an on-screen program guide may list the programs according to the standardized genre assignments. Moreover, a blocking feature may use the standardized genre assignments so that programs associated with a particular genre are blocked from viewing.

The invention provides standardized genre assignments that allow one receiver to be used all over Europe or other region where diverse genre assignments schemes are used. As mentioned, for DVB-T receivers in Europe, genre handling is a problem since D-book and E-book do not agree. Spain introduced its own set of genres, based on E-book with extensions. The D-Book is a shorthand reference to the "Requirements for interoperability for UK Digital Terrestrial Television D-Book", provided by the Digital Television Group (DTG). The text contains details for implementing the DVB standards, and has been adopted in the UK. The E-book refers to a related standard that has been adopted in Europe.

The following is a summary of the tables provided herein:

Table 1—Overview of genre assignments for different countries

Table 2—standardized genre assignments (invention)

Table 3—E-book content descriptors

Table 4—E-book genre assignments

Table 5—Spain genre assignments

Table 6—Australia genre assignments

Table 7—UK D-book genre assignments

Table 8—Finland genre assignments

Table 9—Sweden genre assignments

Table 10—illustrates a content description behavior

An overview of the genre assignment schedules or tables for E-book, Spain, Australia, GBR D-book, and Sweden is provided in Table 1. The first column of the table indicates the standard content nibble. A nibble is a half-byte of data. This is data in the received transmission that associates a genre with a program. Note that the following abbreviations may be used herein: ESP—Spain, UK—United Kingdom, GBR—Great Britain, AUS—Australia, SWE—Sweden.

TABLE 1

Overview of genre assignments for different countries

| Nibble | E-book | ESP | AUS | GBR D-book | SWE |
|---|---|---|---|---|---|
| 0x0 | Undefined | Sin definir (undefined) | Undefined | Unclassified | Odefinierat (unclassified) |
| 0x1 | Movie/Drama | Cine (cinema) | Movie | Movie | Film (movie) |
| 0x2 | News/Current affairs | Informativo (informative) | News | News and Factual | Nyheter (news/current affairs) |
| 0x3 | Show/Game show | Entretenimiento (entertainment) | Entertainment | Entertainment | Nöje (entertainment) |
| 0x4 | Sports | Deporte (sports) | Sport | Sport | Sport |
| 0x5 | Children's/Youth programmes | Infantil (infantile) | Children's | Children's | Barn (children's/youth) |
| 0x6 | Music/Ballet/Dance | Música (music) | Music | Entertainment | Musik (music) |
| 0x7 | Arts/Culture without music | Documental (documentary) | Arts/Culture | News and Factual | Kultur (culture without music) |
| 0x8 | Social/Political issues/Economics | Magazine | Current affairs | News and Factual | Politik (Social/Political issues/Economics) |
| 0x9 | Children's Youth/Education/Science/Factual topics | Televentas (tele-sales) | Education/information | Education | Utbildning (education/science) |
| 0xA | Leisure hobbies | Ocio (leisure) | Infotainment | Lifestyle | Fritid (leisure hobbies) |
| 0xB | Special Characteristics | Toros (bulls) | Special | | |
| 0xC | Reserved | Serie (series) | | Comedy | |
| 0xD | Reserved | Adulto (adult) | | Drama | |
| 0xE | Reserved | Religion | | Documentary | |
| 0xF | User defined | | | | Drama |

The invention provides an example standardized genre assignment schedule in Table 2 that resolves the mix of the genre assignments for the different countries/regions. The schedule uses E-book as starting point (Table 4), and adds nibbles 0xB through 0xE according to the Spanish definition (Table 5), and nibble 0xF according to the UK D-book definition (Table 7). A separate solution can be created for Australia, both for parental control and content description. New icons might be added for Toros (bullfighting), Adulto (adult), and Religion. Moreover, one can use "movie" for serie, comedy and drama. One can also use "educational" for documentary. Generally, the themes can be associated with small icons.

For the genre assignments in Spain (Table 5), the receiver 100 processes the genre assignment data by interpreting the user-nibbles first. If the user-nibbles are set to 0x0 (undefined), then the standard content nibbles are interpreted. All other countries interpret the standard content nibbles, mapping them to standardized genre assignments such as the example assignments shown in Table 2. Table 2 is used when interpreting only level1. According to the Home Audio Video Interoperability (HA Vi) consortium, a level1 user interface uses a data driven interaction for the intermediate AV Device (IAV). A level 2 user interface uses Java for the more advanced full AV device (FAV).

Note that the use of one or more nibbles to map a program to a standardized genre is an example only, as many variations are possible.

TABLE 2

Standardized Genre Assignments

| Nibble: | Genre: |
|---|---|
| 0x00 | Undefined |
| 0x01 | Movie/Drama |
| 0x02 | News/Current affairs |
| 0x03 | Show/Game show |
| 0x04 | Sports |
| 0x05 | Children's/Youth programs |
| 0x06 | Music/Ballet/Dance |
| 0x07 | Arts/Culture without music |
| 0x08 | Social/Political issues/Economics |
| 0x09 | Education/Science/Factual topics |
| 0x0A | Leisure/Hobbies |
| 0x0B | Bullfighting (ESP) |
| 0x0C | Series (ESP) |
| 0x0D | Adult (ESP) |
| 0x0E | Religion (ESP) |
| 0x0F | Drama (UK) |

The genres 0x0B through 0x0F have a code attached to indicate the country they come from. Under normal circumstances these genres will only be used in the respective countries.

Table 3 provides the syntax of the E-book content descriptors. The version of the E-book/EN 300 468 standard used is discussed in EACEM Technical Report, Number TR-030 version 1.1, 7 Apr. 2000, and ETSE EN 300 468 v1.4.1, November 2000, respectively. The recommended descriptor is as defined in EN 300 468. The intention of the content descriptor is to provide classification information for an event.

The content_descriptor() includes a total of four nibbles (two DVB, two USER). Such a combination of two nibbles allows for 2 levels of user interfaces: a level 1 interface that only uses the first nibble, and a level 2 interface using the second nibble, allowing an extra subdivision per given theme or genre.

TABLE 3

E-book Content Descriptor

| Syntax | No. of bits | Identifier |
|---|---|---|
| content descriptor( ){ | | |
|    descriptor_tag | 8 | uimsbf |
|    descriptor_length | 8 | uimsbf |
|    for (i=0;i<N;i++) { | | |
|       content_nibble_level_1 | 4 | uimsbf |
|       content_nibble_level_2 | 4 | uimsbf |
|       user_nibble | 4 | uimsbf |
|       user_nibble | 4 | uimsbf |
|    } | | |
| } | | |

The semantics of the content descriptors are as follows.

content_nibble_level_1: This 4-bit field represents the first level of a (standard) content identifier. This field should be coded according to Table 4.

content_nibble_level_2: This 4-bit field represents the second level of a (standard) content identifier. This field should be coded according to Table 4.

user_nibble: This 4-bit field is defined by the broadcaster.

Table 4 provides example E-book genre assignments and, more specifically, genre assignments for Content_nibble levels 1 and 2.

TABLE 4

E-book genre assignments

| Content_nibble_level_1 | Content_nibble_level_2 | Description |
|---|---|---|
| 0x0 | 0x0 to 0xF | undefined content |
| Movie/Drama: | | Movie/Drama: |
| 0x1 | 0x0 | movie/drama (general) |
| 0x1 | 0x1 | detective/thriller |
| 0x1 | 0x2 | adventure/western/war |
| 0x1 | 0x3 | science fiction/fantasy/horror |
| 0x1 | 0x4 | comedy |
| 0x1 | 0x5 | soap/melodrama/folkloric |
| 0x1 | 0x6 | romance |
| 0x1 | 0x7 | serious/classical/religious/historical movie/drama |
| 0x1 | 0x8 | adult movie/drama |
| 0x1 | 0x9 to 0xE | reserved for future use |
| 0x1 | 0xF | user defined |
| News/Current affairs: | | News/Current affairs: |
| 0x2 | 0x0 | news/current affairs (general) |
| 0x2 | 0x1 | news/weather report |
| 0x2 | 0x2 | news magazine |
| 0x2 | 0x3 | documentary |
| 0x2 | 0x4 | discussion/interview/debate |
| 0x2 | 0x5 to 0xE | reserved for future use |
| 0x2 | 0xF | user defined |
| Show/Game show: | | Show/Game show: |
| 0x3 | 0x0 | show/game show (general) |
| 0x3 | 0x1 | game show/quiz/contest |
| 0x3 | 0x2 | variety show |
| 0x3 | 0x3 | talk show |
| 0x3 | 0x4 to 0xE | reserved for future use |
| 0x3 | 0xF | user defined—ETSI |
| Sports: | | Sports: |
| 0x4 | 0x0 | sports (general) |
| 0x4 | 0x1 | special events (Olympic Games, World Cup etc.) |
| 0x4 | 0x2 | sports magazines |
| 0x4 | 0x3 | football/soccer |
| 0x4 | 0x4 | tennis/squash |
| 0x4 | 0x5 | team sports (excluding football) |
| 0x4 | 0x6 | athletics |
| 0x4 | 0x7 | motor sport |
| 0x4 | 0x8 | water sport |
| 0x4 | 0x9 | winter sports |
| 0x4 | 0xA | equestrian |
| 0x4 | 0xB | martial sports |
| 0x4 | 0xC to 0xE | reserved for future use |
| 0x4 | 0xF | user defined |
| Children's/Youth programs: | | Children's/Youth programs: |
| 0x5 | 0x0 | children's/youth programs (general) |
| 0x5 | 0x1 | pre-school children's programs |
| 0x5 | 0x2 | entertainment programs for 6 to 14 |
| 0x5 | 0x3 | entertainment programs for 10 to 16 |
| 0x5 | 0x4 | informational/educational/school programs |
| 0x5 | 0x5 | cartoons/puppets |
| 0x5 | 0x6 to 0xE | reserved for future use |
| 0x5 | 0xF | user defined |
| Music/Ballet/Dance: | | Music/Ballet/Dance: |

TABLE 4-continued

E-book genre assignments

| Content_nibble_level_1 | Content_nibble_level_2 | Description |
|---|---|---|
| Ballet/Dance: | | |
| 0x6 | 0x0 | music/ballet/dance (general) |
| 0x6 | 0x1 | rock/pop |
| 0x6 | 0x2 | serious music/classical music |
| 0x6 | 0x3 | folk/traditional music |
| 0x6 | 0x4 | jazz |
| 0x6 | 0x5 | musical/opera |
| 0x6 | 0x6 | ballet |
| 0x6 | 0x7 to 0xE | reserved for future use |
| 0x6 | 0xF | user defined |
| Arts/Culture without music): | | Arts/Culture (without music): |
| 0x7 | 0x0 | arts/culture (without music, general) |
| 0x7 | 0x1 | performing arts |
| 0x7 | 0x2 | fine arts |
| 0x7 | 0x3 | religion |
| 0x7 | 0x4 | popular culture/traditional arts |
| 0x7 | 0x5 | literature |
| 0x7 | 0x6 | film/cinema |
| 0x7 | 0x7 | experimental film/video |
| 0x7 | 0x8 | broadcasting/press |
| 0x7 | 0x9 | new media |
| 0x7 | 0xA | arts/culture magazines |
| 0x7 | 0xB | fashion |
| 0x7 | 0xC to 0xE | reserved for future use |
| 0x7 | 0xF | user defined |
| Social/Political issues/Economics: | | Social/Political issues/Economics: |
| 0x8 | 0x0 | social/political issues/economics (general) |
| 0x8 | 0x1 | magazines/reports/documentary |
| 0x8 | 0x2 | economics/social advisory |
| 0x8 | 0x3 | remarkable people |
| 0x8 | 0x4 to 0xE | reserved for future use |
| 0x8 | 0xF | user defined |
| Children's/Youth programs: | | Children's/Youth programs: |
| Education/Science/Factual topics: | | Education/Science/Factual topics: |
| 0x9 | 0x0 | education/science/factual topics (general) |
| 0x9 | 0x1 | nature/animals/environment |
| 0x9 | 0x2 | technology/natural sciences |
| 0x9 | 0x3 | medicine/physiology/psychology |
| 0x9 | 0x4 | foreign countries/expeditions |
| 0x9 | 0x5 | social/spiritual sciences |
| 0x9 | 0x6 | further education |
| 0x9 | 0x7 | languages |
| 0x9 | 0x8 to 0xE | reserved for future use |
| 0x9 | 0xF | user defined |
| Leisure hobbies: | | Leisure hobbies: |
| 0xA | 0x0 | leisure hobbies (general) |
| 0xA | 0x1 | tourism/travel |
| 0xA | 0x2 | handicraft |
| 0xA | 0x3 | motoring |
| 0xA | 0x4 | fitness & health |
| 0xA | 0x5 | cooking |
| 0xA | 0x6 | advertisement/shopping |
| 0xA | 0x7 | gardening |
| 0xA | 0x8 to 0xE | reserved for future use |
| 0xA | 0xF | user defined |
| 0xB | 0x0 | original language |
| 0xB | 0x1 | black & white |
| 0xB | 0x2 | unpublished |
| 0xB | 0x3 | live broadcast |
| 0xB | 0x4 to 0xE | reserved for future use |
| 0xB | 0xF | user defined |
| 0xC to 0xE | 0x0 to 0xF | reserved for future use |
| 0xF | 0x0 to 0xF | user defined |

Table 5 provides genre assignments for Spain. The content nibble definition provided by DVB does not cover all the usual events broadcasted in Spain. For example, there is no appropriate content nibble for "Toros" or bullfighting (nibble 0xB). Moreover, some content nibbles are too specific. For example, there is a unique content nibble to describe western, adventure and war events. See level 2 nibbles 0xB, 0xC, and 0xD, respectively, under level 1 nibble 0x1. To provide a description that better matches the values needed in Spain, broadcasters and receivers are recommended to use user nibble values defined in Table 5.

Broadcasters should still send the content nibble as defined in DVB, regardless if they are sending user nibble for that event. Receivers following this specification should use the user nibble value instead of the content nibble when it is present. If no user nibble is present, the content nibble will be used. Broadcasters should avoid using other values than as defined since they will not have a meaning for receivers following the present scheme.

TABLE 5

Spain genre assignments

| User nibble level 1 | Description | User nibble level 2 | Description |
|---|---|---|---|
| 0x0 | Sin definir | 0x0 to 0xF | Sin definir (undefined) |
| 0x1 | Cine (cinema) | 0x0 | general |
| | | 0x1 | suspense |
| | | 0x2 | Acción (action) |
| | | 0x3 | ciencia-ficción (science fiction) |
| | | 0x4 | Comedia (comedy) |
| | | 0x5 | drama |
| | | 0x6 | Romántico (romantic) |
| | | 0x7 | Histórico (historic) |
| | | 0x8 | Erótico (erotic) |
| | | 0x9 | Musical |
| | | 0xA | Policíaco (police) |
| | | 0xB | Vaqueros (Western) |
| | | 0xC | Aventuras (adventure) |
| | | 0xD | Bélico (war) |
| | | 0xE | Infantil (children) |
| | | 0xF | experimental |
| 0x2 | Informativo (informative) | 0x0 | general |
| | | 0x1 | el tiempo (weather) |
| | | 0x2 | Actualidad (current events) |
| | | 0x3 | Diario (newspaper) |
| | | 0x4 | Debate |
| | | 0x5 | Económico (economic) |
| | | 0x6 to 0xF | |
| 0x3 | Entretenimiento (entertainment) | 0x0 | General |
| | | 0x1 | Concurso (contest) |
| | | 0x2 | Variedades (variety) |
| | | 0x3 | Entrevistas (interviews) |
| | | 0x4 | Ofertas (promotions) |
| | | 0x5 | Debate |
| | | 0x6 | Espectáculos (spectacles) |
| | | 0x7 | Divulgativos (divulging) |
| | | 0x8 | Teatro (theatre) |
| | | 0x9 to 0xF | |
| 0x4 | Deporte (sports) | 0x0 | General |
| | | 0x1 | evento especial (special events) |
| | | 0x2 | Informativo (informative) |
| | | 0x3 | Fútbol (soccer) |
| | | 0x4 | Tenis (tennis) |
| | | 0x5 | Atletismo (athletics) |
| | | 0x6 | Motor (automotive) |
| | | 0x7 | Acuáticos (aquatics) |
| | | 0x8 | de invierno (winter |

TABLE 5-continued

Spain genre assignments

| User nibble level 1 | Description | User nibble level 2 | Description |
|---|---|---|---|
| | | | sports) |
| | | 0x9 | equitación (equestrian) |
| | | 0xA | artes marciales (martial arts) |
| | | 0xB | Baloncesto (basketball) |
| | | 0xC | golf |
| | | 0xD | Ciclismo (cycling) |
| | | 0xE | Naútico (boating) |
| | | 0xF | |
| 0x5 | Infantil (children's) | 0x0 | general |
| | | 0x1 | pre-escolar (pre-school) |
| | | 0x2 | Entretenimiento (entertainment) |
| | | 0x3 | Concurso (contest) |
| | | 0x4 | Educativo (educational) |
| | | 0x5 | dibujos animados (cartoons) |
| | | 0x6 to 0xF | |
| 0x6 | Musica (music) | 0x0 | General |
| | | 0x1 | Concierto (concert) |
| | | 0x2 | Directo (live event) |
| | | 0x3 | Entrevista (interview) |
| | | 0x4 | Espectáculo (spectacle) |
| | | 0x5 | Video clip |
| | | 0x6 | Ballet |
| | | 0x7 to 0xF | |
| 0x7 | Documental (documentary) | 0x0 | General |
| | | 0x1 | Naturaleza (nature) |
| | | 0x2 | ciencia-tecnologia (science-technology) |
| | | 0x3 | Medicina (medicine) |
| | | 0x4 | Viajes (trips) |
| | | 0x5 | Sociológico (sociological) |
| | | 0x6 | Educativo (educational) |
| | | 0x7 | Idiomas (langauges) |
| | | 0x8 | Actualidad (current events) |
| | | 0x9 | Arte (art) |
| | | 0xA | Histórico (history) |
| | | 0xB | Cultura (culture) |
| | | 0xC | Tradiciones (traditions) |
| | | 0xD | Comunicación (communication) |
| | | 0xE | nuevos medios (new developments) |
| | | 0xF | |
| 0x8 | Magazine | 0x0 | general |
| | | 0x1 | Cine (cinema) |
| | | 0x2 | Música (music) |
| | | 0x3 | Toros (bullfighting) |
| | | 0x4 | Fútbol (soccer) |
| | | 0x5 | Deportes (sports) |
| | | 0x6 | Actualidad (current events) |
| | | 0x7 | Economía (economics) |
| | | 0x8 | Cultura (culture) |
| | | 0x9 | Literatura (literature) |
| | | 0xA | Moda (fashion) |
| | | 0xB to 0xF | |
| 0x9 | Televentas (telesales) | 0x0 | general |
| | | 0x1 to 0xF | |
| 0xA | Ocia (leisure) | 0x0 | general |
| | | 0x1 | Viajes (trips) |
| | | 0x2 | Artesanía (crafts) |
| | | 0x3 | Motor (automotive) |
| | | 0x4 | Salud (health) |
| | | 0x5 | Cocina (cooking) |
| | | 0x6 | Compras (purchases) |
| | | 0x7 | Jardín (garden) |
| | | 0x8 to 0xF | |
| 0xB | Toros (bullfighting) | 0x0 | general |
| | | 0x1 to 0xF | |
| 0xC | Serie (series) | 0x0 | general |
| | | 0x1 | suspense |
| | | 0x2 | Acción (action) |
| | | 0x3 | ciencia-ficción (science-fiction) |
| | | 0x4 | Comedia (comedy) |
| | | 0x5 | Drama |
| | | 0x6 | Romántico (romantic) |
| | | 0x7 | Histórico (historic) |
| | | 0x8 | Erótico (erotic) |
| | | 0x9 | Musical |
| | | 0xA | Policíaco (police) |
| | | 0xB | Vaqueros (Western) |
| | | 0xC | aventuras (adventure) |
| | | 0xD | Bélico (war) |
| | | 0xE | Infantil (children's) |
| | | 0xF | Experimental |
| 0xD | Adulto | 0x0 | General |
| | | 0x1 | Hetero |
| | | 0x2 | Gay |
| | | 0x3 to 0xF | |
| 0xE | Religion | 0x0 | General |
| | | 0x1 to 0xF | |
| 0xF | | 0x0 to 0xF | |

Table 6 provides Australia genre assignments according to Digital television—Requirements for receivers Part 1: VHF/UHF DVB-T television broadcasts, first published as AS 4933.1-2000. Draft—Ver 3 27 Aug. 2001. Note the Australian variation to DVB. Receivers may display; as required, a program's classification/genre type (e.g., genre) as identified by the content_descriptor (Tag value 0x54) found in the EIT. Only the content_nibble_level_1 is currently defined and is as follows. Content_nibble_level_2 and user_nibble are currently not defined.

TABLE 6

Australia genre assignments

| Content_nibble_level_1 code | Description |
|---|---|
| 0x0 | Undefined content |
| 0x1 | Movie |
| 0x2 | News |
| 0x3 | Entertainment |
| 0x4 | Sport |
| 0x5 | Children's |
| 0x6 | Music |
| 0x7 | Arts/Culture |
| 0x8 | Current Affairs |
| 0x9 | Education/Information |
| 0xA | Infotainment |
| 0xB | Special |
| 0xC | Comedy |
| 0xD | Drama |
| 0xE | Documentary |
| 0xF | Reserved—not defined |

Table 7 provides the UK D-book genre assignments, e.g., the Program Genre Coding, according to Digital Terrestrial Television. Version 3:01, last updated 11 Feb. 2001. The coding of Table 7, from d-book: 8.5.2.2 Content (Genre) Coding, identifies the genre or genre of the program (event). It is carried within the content descriptor of the Event Information Table (EIT). The EIT provides program titles and technical data about the planned events on the virtual channels. Each event should be given a maximum of one content description from the UK DTT list in Table 7. Codes are assigned in line with Table 18 in ETS 300 468 (content definition table), and mapped from the DVB service information (SI) table.

Content nibble level 1 only is significant. Content level 2 defines sub-genres or sub-genres. Note that Drama is distinguished from Movies by being assigned a User defined code (0xF0). If there is no content coding in conformance with Table 7 present for an event, the default content description "unclassified" applies. Note that content descriptors from other delivery media may use a different coding method for the content.

TABLE 7

UK D-book genre assignments

| Content_nibble_level_1 | DVB Description (for information only) | DTT Description |
|---|---|---|
| 0x0 | Unclassified | Unclassified |
| 0x1 | Movie/Drama | Movie |
| 0x2 | News/Current affairs | News and Factual |
| 0x3 | Show/Game show | Entertainment |
| 0x4 | Sports | Sport |
| 0x5 | Children's/Youth programs | Children's |
| 0x6 | Music/Ballet/Dance | Entertainment |
| 0x7 | Arts/Culture (without music) | News and Factual |
| 0x8 | Social/Political Issues/Economics | News and Factual |
| 0x9 | Education/Science/Factual Topics | Education |
| 0xA | Leisure hobbies | Lifestyle |
| 0xB | Special Characteristics | not supported |
| 0xC to 0xE | Reserved for future use | not supported |
| 0xF | user defined | Drama |

Table 8 provides Finland Genre Assignments based on Rules of operation of service information in the DTTV network, version 1.3, last updated Dec. 9, 2001. A third column can be defined for Finnish DTTV based on the DVB genre description.

TABLE 8

Finland Genre Assignments

| Content_nibble_level_1 | DVB Description (for information only) |
|---|---|
| 0x0 | Unclassified |
| 0x1 | Movie/Drama |
| 0x2 | News/Current affairs |
| 0x3 | Show/Game show |
| 0x4 | Sports |
| 0x5 | Children's/Youth programs |
| 0x6 | Music/Ballet/Dance |
| 0x7 | Arts/Culture (without music) |
| 0x8 | Social/Political Issues/Economics |
| 0x9 | Education/Science/Factual Topics |
| 0xA | Leisure hobbies |
| 0xB | Special Characteristics |
| 0xC to 0xE | Reserved for future use |
| 0xF | user defined |

Table 9 provides Sweden genre assignments based on Digital Terrestrial TV Receiver Specification Minimum Technical Requirements for the Swedish Digital Terrestrial Network, Revision 1.0, Date May 5, 2002. The Zapper IRD should handle all nibbles listed in the DVB SI specification (ETSI EN 300 468), but should at least be able to handle the content nibble level 1 coding listed in Table 9. If there is no content coding in conformance with the table present for an event, the default content description "unclassified" should be assumed by the receiver.

TABLE 9

Sweden genre assignments

| Level 1 | Description | Translation to be used in S-DTT |
|---|---|---|
| 0x0 | Unclassified | Odefinierat |
| 0x1 | Movie | Film |
| 0x2 | News/Current Affairs | Nyheter |
| 0x3 | Entertainment | Nöje |
| 0x4 | Sport | Sport |
| 0x5 | Children's/Youth | Barn |
| 0x6 | Music | Musik |
| 0x7 | Culture (without music) | Kultur |
| 0x8 | Social/political Issues/Economics | Politik |
| 0x9 | Education/Science | Utbildning |
| 0xA | Leisure hobbies | Fritid |
| 0xB | Not supported | |
| 0xC-0xE | Reserved for future use | |
| 0xF | User defined | |

Table 10 illustrates a content description behavior specified in 3.3.5 "Long zap banner" and appendix B "Supported themes"—MMI-FRS Zapper & ESG v6.2: (AR6-920078KD/C6S13, status: approved). E-book content_nibble_1 is made visible through an icon. Content_nibble_2 is not supported. Content_nibble_1 value 0x0B (Special characteristics) and 0x0F (User defined) have no icon defined. Differences from the E-book specification are indicated.

A suggested solution for content description is to only support content_nibble_1, and use a table for nibble 1 per country. This introduces a lot of new strings (supported countries×16×osd languages), but covers everything. The addition of content_nibble_2 introduces numerous strings. Also, we seem to use only content_nibble_1 as an integer (int) throughout our code.

For Spain, the specification is just draft. It is not clear whether they will also transmit the content_nibble_1. If not, only interpret user_nibble_1 as content_nibble_1. This will take quite some work, simply to retrieve the user_nibble_1.

The column entitled "missing" denotes that no definition has been provided for the data indicated in the associated country. The missing "Content_nibble_2" is of no concern for receivers that only interpret "Content_nibble_1".

TABLE 10

| Country: | Missing: |
|---|---|
| France | Content_nibble_2 |
| Spain | Complete user nibble 1 & 2 interpretation |
| Portugal | ? |
| Italy | ? |
| Netherlands | ? |
| Australia | Content_nibble_1 interpreted differently |
| UK | Content_nibble_1 interpreted differently |
| Norway | Content_nibble_2 |
| Finland | Content_nibble_2 |
| Sweden | Content_nibble_2, however minimum is covered |

FIG. 2 illustrates a method for providing genre assignments, according to the invention. Genre data may be carried in a digital data transmission in the standard content nibbles or user nibbles, in one possible approach. For example, most countries use the standard content nibbles while currently Spain uses the user nibbles. Block 200 states "receive digital transmission." Thus, a digital television or other digital data transmission is received by a receiver. Block 210 asks "user nibbles defined?" If they are defined, processing continues at block 220, which states "decode user nibbles". This is done to recover the original genre data for a program. The country associated with the data transmission may also be determined, e.g., based on the term ON1, which is the Original Network Id (original_network_id) from the associated country. Based on the country or other jurisdiction, the corresponding genre assignment schedule or table can be determined.

If the user nibbles are not defined at block 210, processing continues at block 230, which states "decode standard nibbles." This is done to recover the original genre data for a program. After processing at blocks 220 or 230, processing continues at block 240, which states "map nibbles to standardized themes/genres." Here, the nibbles are mapped to genres in the standardized genre assignment schedule, e.g., per Table 2. Note that the receiver can determine from the received transmission whether it needs to interpret the user nibbles or standard content nibbles.

The use of nibbles as discussed to identify and map genres is only one possible implementation. Other implementations will be apparent to those skilled in the art in view of the teachings herein. Generally, any data that identifies the genre of a program can be interpreted and mapped.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but should be construed to cover all modifications that may fall within the scope of the appended claims.

What is claimed is:

1. A method for providing standardized genre assignments, the method comprising:
   receiving at least a first digital data transmission; wherein at least one program in the first digital data transmission is associated with a genre according to a first genre assignment schedule;
   identifying a jurisdiction associated with the first genre assignment schedule;
   obtaining data from the first digital data transmission that identifies the associated genre; and
   mapping the at least one program to a genre in a standardized genre assignment schedule according to the associated identified jurisdiction and the associated identified genre,
   wherein the obtaining of data includes obtaining a user nibble, if available, that identifies the associated genre, and, if the user nibble is not available, obtaining a standard content nibble that identifies the associated genre.

2. The method of claim 1, wherein the identifying of the jurisdiction includes obtaining data from the first digital data transmission that identifies a country.

3. The method of claim 1, wherein the identifying of the jurisdiction includes obtaining a user setting that identifies a country.

4. The method of claim 1, wherein the first digital data transmission is provided according to a Digital Video Broadcasting standard.

5. The method of claim 1, wherein the first digital data transmission includes at least one of audio and video data.

6. The method of claim 1, wherein the first digital data transmission is received at at least one of a television and a set-top box.

7. The method of claim 1, wherein the first digital data transmission is provided in at least one of a broadcast, multicast and streaming content.

8. A program storage device tangibly embodying a program of instructions executable by a machine to perform a method for providing standardized genre assignments, the method comprising:
   receiving at least a first digital data transmission; wherein at least one program in the first digital data transmission is associated with a genre according to a first genre assignment schedule;
   identifying a jurisdiction associated with the first genre assignment schedule;
   obtaining data from the first digital data transmission that identifies the associated genre; and
   mapping the at least one program to a genre in a standardized genre assignment schedule according to the associated identified jurisdiction and the associated identified genre,
   wherein the obtaining of data includes obtaining a user nibble, if available, that identifies the associated genre, and, if the user nibble is not available, obtaining a standard content nibble that identifies the associated genre.

9. The program storage device of claim 8, wherein the first digital data transmission is provided according to a Digital Video Broadcasting standard.

10. The program storage device of claim 8, wherein the first digital data transmission includes at least one of audio and video data.

11. The program storage device of claim 8, wherein the first digital data transmission is received at at least one of a television and a set-top box.

12. The program storage device of claim 8, wherein the first digital data transmission is provided in at least one of a broadcast, multicast and streaming content.

13. A receiver comprising:
    means for receiving at least a first digital data transmission; wherein at least one program in the first digital data transmission is associated with a genre according to a first genre assignment schedule;
    means for identifying a jurisdiction associated with the first genre assignment schedule;
    means for obtaining data from the first digital data transmission that identifies the associated genre; and means for mapping the at least one program to a genre in a standardized genre assignment schedule according to the associated identified jurisdiction and the associated identified genre, wherein the obtaining of data includes obtaining a user nibble, if available, that identifies the associated genre, and, if the user nibble is not available, obtaining a standard content nibble that identifies the associated genre.

14. A receiver comprising:

a tuner for receiving at least a first digital data transmission; wherein at least one program in the first digital data transmission is associated with a genre according to a first genre assignment schedule; and a control associated with the tuner for executing instructions to identify a jurisdiction associated with the first genre assignment schedule, obtain data from the first digital data transmission that identifies the associated genre, and map the at least one program to a genre in a standardized genre assignment schedule according to the associated identified jurisdiction and the associated identified genre, wherein the control executes the instructions to obtain the data by obtaining a user nibble, if available, that identifies the associated genre, and, if the user nibble is not available, obtaining a standard content nibble that identifies the associated genre.

15. The receiver of claim 14, wherein the control executes the instructions to identify the jurisdiction by obtaining data from the first digital data transmission that identifies a country.

16. The receiver of claim 14, wherein the control executes the instructions to identify the jurisdiction by obtaining a user setting that identifies a country.

17. The receiver of claim 14, wherein the first digital data transmission is provided according to a Digital Video Broadcasting standard.

18. The receiver of claim 14, wherein the first digital data transmission includes at least one of audio and video data.

19. The receiver of claim 14, wherein the first digital data transmission is received at at least one of a television and a set-top box.

20. The receiver of claim 14, wherein the first digital data transmission is provided in at least one of a broadcast, multicast and streaming content.

* * * * *